Aug. 30, 1932.   F. L. FULLER   1,874,276
CASH REGISTER
Filed April 1, 1926   6 Sheets-Sheet 5
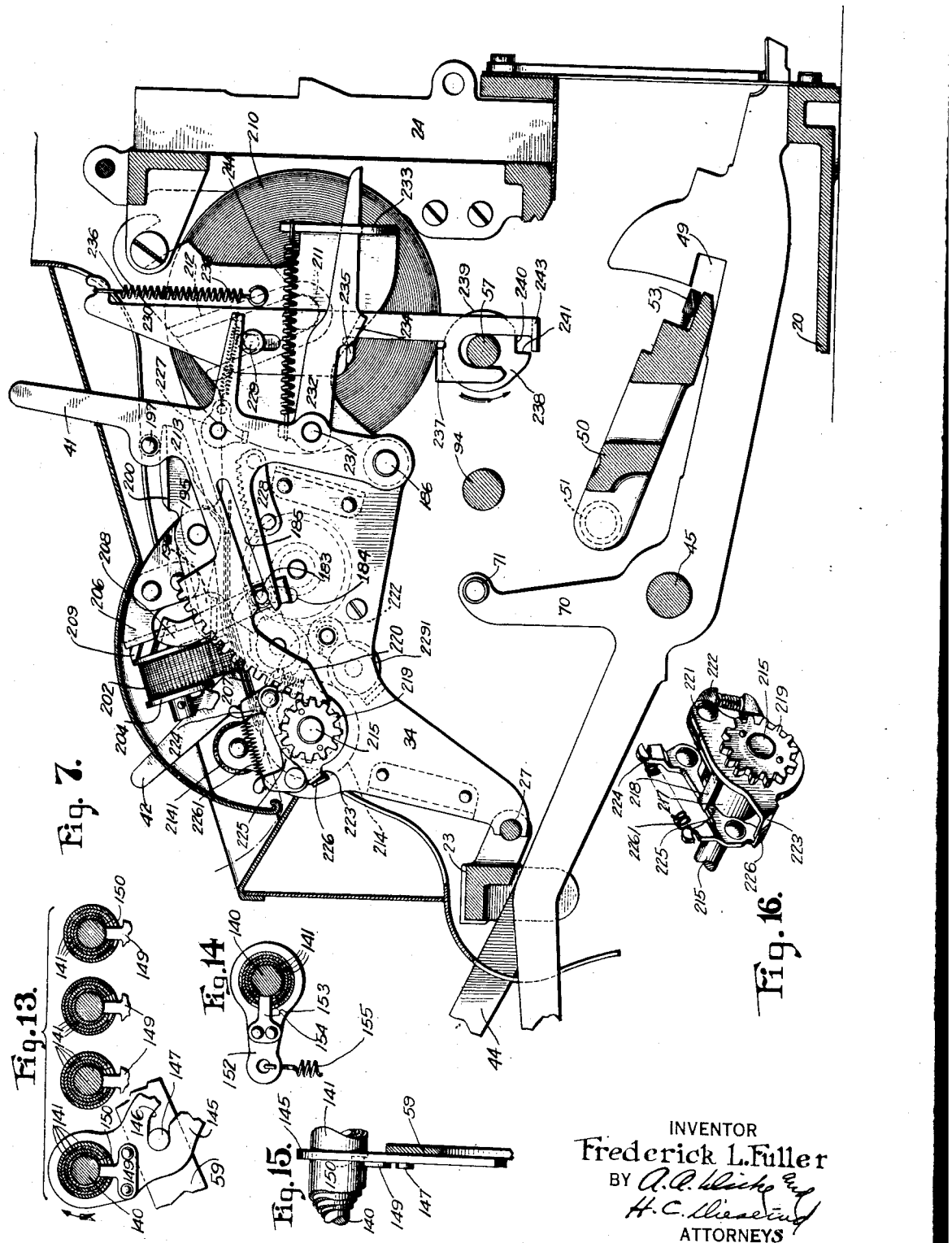
INVENTOR
Frederick L. Fuller
BY
ATTORNEYS Aug. 30, 1932.  F. L. FULLER  1,874,276
CASH REGISTER
Filed April 1, 1926  6 Sheets-Sheet 6
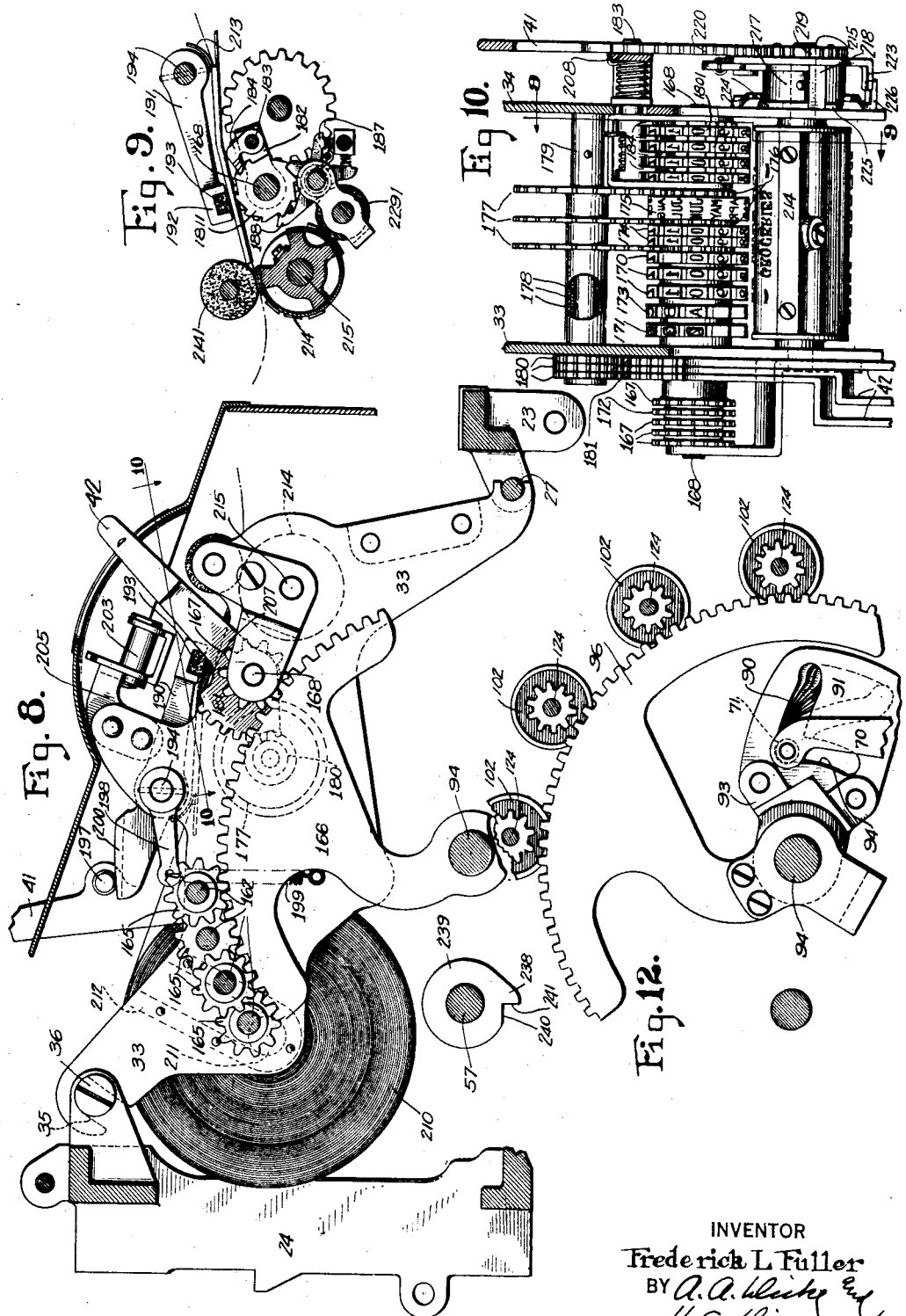
INVENTOR
Frederick L. Fuller
BY
ATTORNEYS Patented Aug. 30, 1932

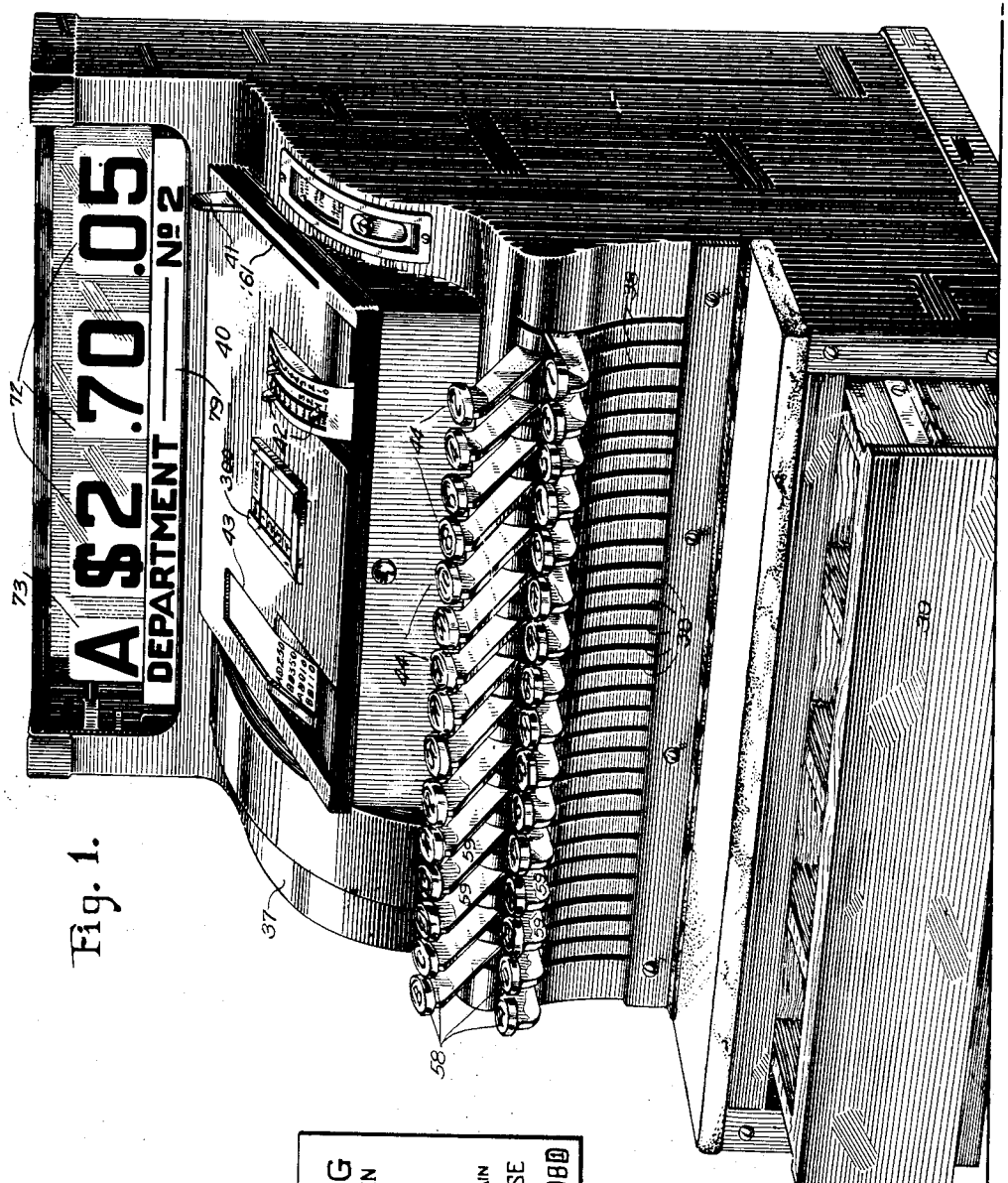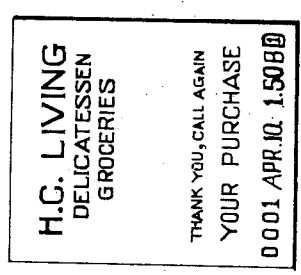

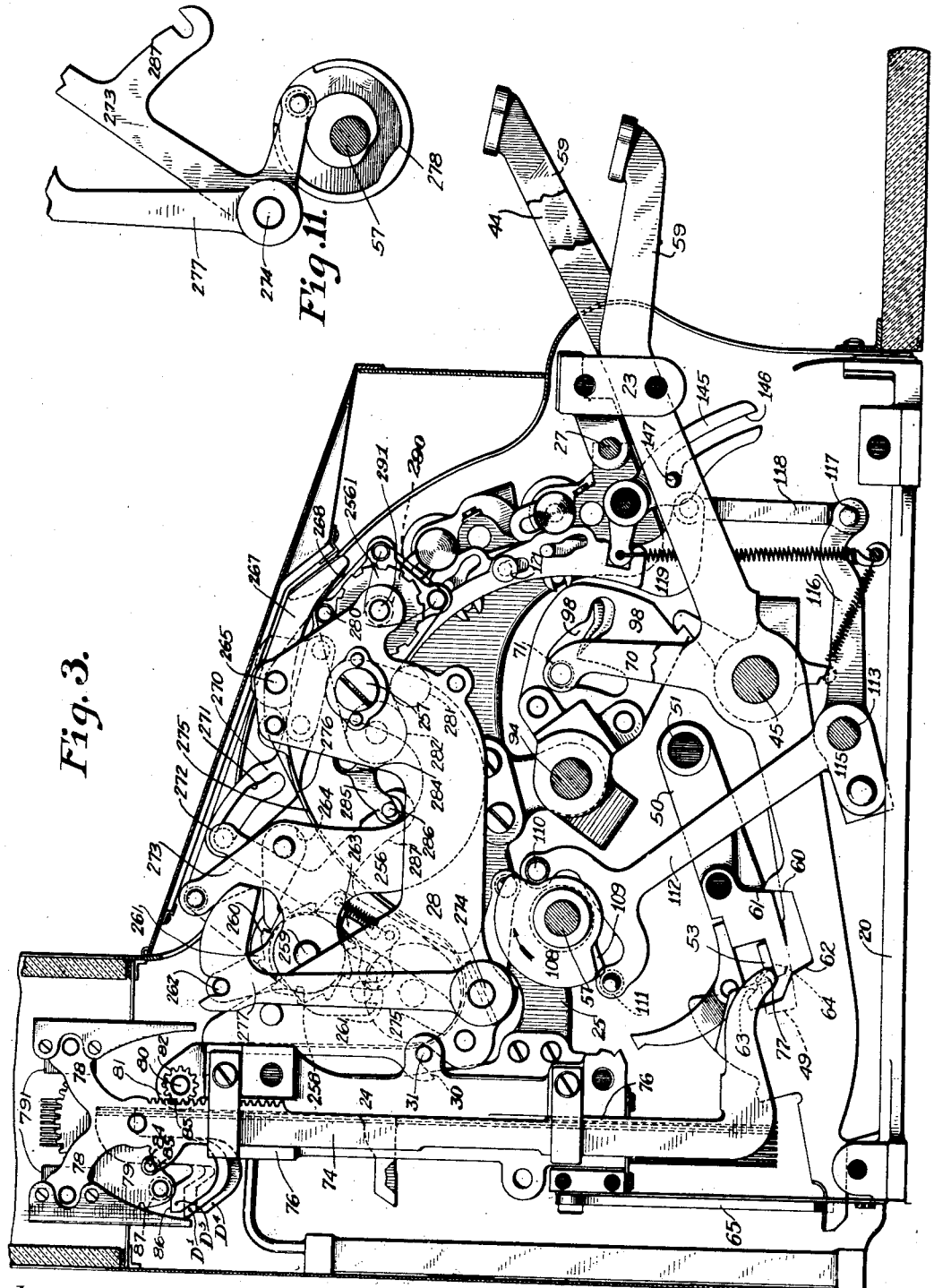

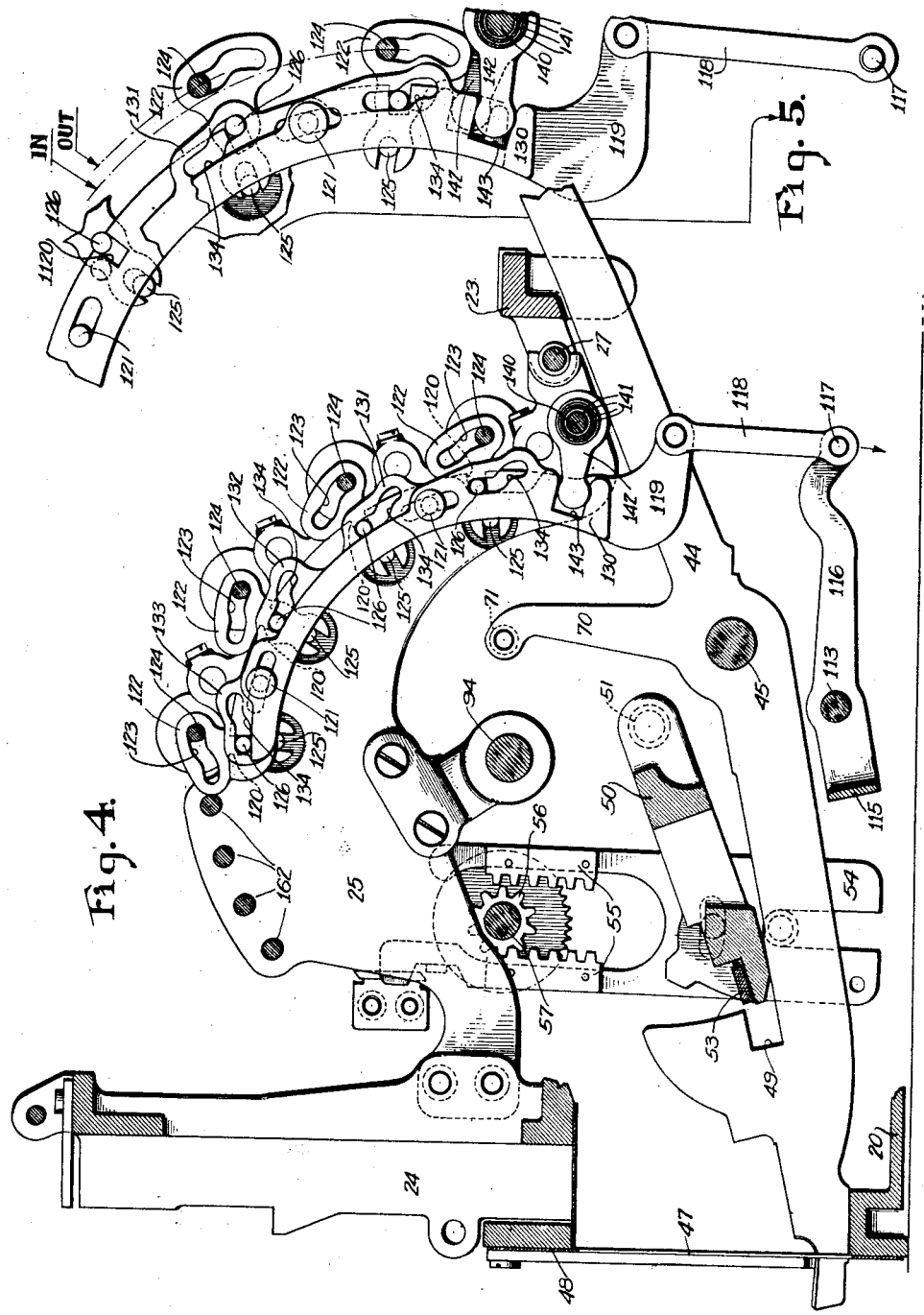

1,874,276

UNITED STATES PATENT OFFICE

FREDERICK L. FULLER, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 1, 1926. Serial No. 99,020.

This invention relates to improvements in cash registering machines and more particularly to that class of machines employing a plurality of individual totalizers.

One object of the present invention is to adapt the register for a segregate analysis of transactions by the provision of a plurality of totalizers with mechanism capable of a preliminary adjustment to establish co-operative relation between anyone of the said totalizers and a common totalizer operating means.

A further object of the present invention is to provide improved mechanism for printing the amounts of each transaction and certain identifying characters upon a record strip which is contained within the machine. An improved mechanism is also provided for the present machine capable of printing, in addition to the amounts, dates, identifying characters and certain other matter upon checks which are issued from the machine. Associated with the check printing mechanism is a novel driving mechanism for the electro as well as certain other accessory mechanisms.

A still further object of the present invention is to provide a simple and effective mechanism for locking the keys in their depressed positions and means for freeing them after an operation of the check issuing lever.

Still another object of the present invention is to provide means for preventing a second depression of the keys until the check issuing lever is returned to its normal position.

In the accompanying drawings the improvements are shown in one form which they might take when applied to or embodied in machines of the key operated type shown and described in the British patents to Frederick L. Fuller; 140,363; 157,823; 157,824 and 157,825 and the U. S. applications Serial No. 263,125, filed November 19, 1918, Serial No. 283,720, filed March 20, 1919 by Frederick L. Fuller and application Serial No. 631,223, filed April 10, 1923, by Charles W. Thistlethwaite. The above applications have matured into Patents 1,742,701, January 7, 1930; 1,729,338, September 4, 1929; and 1,722,446,
July 30, 1929, respectively. However, this embodiment is illustrative only as the improvements are capable of modification and change to permit applying them to machines of other types and it is the desire not to be limited to the form of embodiment herein shown and described.

With these and incidental objects in view, the invention consists in certain novel features of construction and combination of parts, a preferred form of embodiment of which is hereinafter described with reference to the drawings which accompany and form part of the specification.

Of said drawings:

Fig. 1 is a perspective view of the type of machine disclosed in the Fuller applications above referred to with the various novel features applied thereto.

Fig. 3 is a view taken on the line 3—3 of Fig. 2 showing the arrangement of the totalizers, part of the mechanism for selecting them for operation and illustrating in detail the record strip printing device and associated parts.

Fig. 4 is a view taken on the line 4—4 of Fig. 2 showing one of the keys, the key coupler, the mechanism for rotating the main drive shaft, and a detail view of the novel totalizer controlling and selecting mechanism.

Fig. 5 is a view of the totalizer selecting mechanism shown in Fig. 4, but shows the parts in operated position, in this particular instance, the lower totalizer being selected for operation by the actuating racks.

Fig. 6 (Sheet 1) represents a sample of a check capable of being issued by the illustrative machine.

Fig. 7 is a view taken on the line 7—7 of Fig. 2 illustrating in detail the check printer and interlocking mechanism.

Fig. 8 is a view of the opposite side of the check printer looking from left to right as viewed in Fig. 2.

Fig. 9 is a detail view of the platen for effecting impressions upon a check, the electro and the consecutive numbering and printing device for the issued checks.

Fig. 10 is a top plan view taken in the line 10—10 of Fig. 8 showing in detail the type carriers for printing the amounts, identifying characters and the date type carriers and the means for setting them. This view also shows the novel driving mechanism for the electro and check paper.

Fig. 11 is a view in side elevation showing part of the driving mechanism for feeding the record strip and inking ribbon.

Fig. 12 is a view in side elevation showing the differential mechanism and one of the segmental racks for operating the totalizers.

Fig. 13 is a collective view showing the different arrangements of the tubes and the means for actuating them in order to select a particular totalizer for operation.

Fig. 14 is a view in section showing the arrangement of the tubes and the tensioning means for returning them to normal after being operated.

Fig. 15 is an end view of the parts illustrated in the left hand figure of Fig. 13.

Fig. 16 is a perspective view of the novel driving mechanism for the electro, the means for preventing an over-rotation and the simple but effective mechanism which insures the correct timing relation between the electro and check issuing lever.

Figure 2:
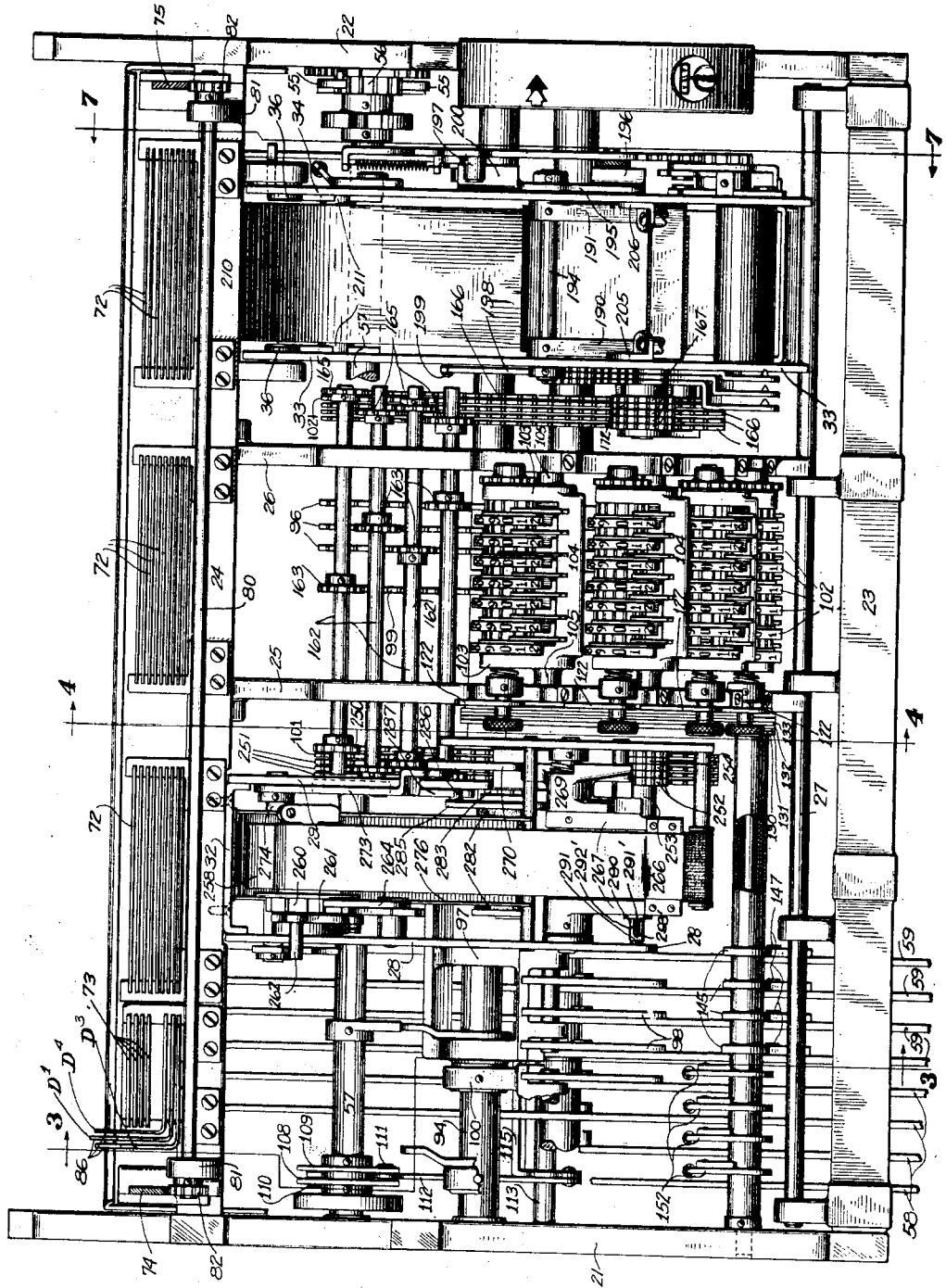
Fig. 2 is a top plan view of the machine with the cabinet removed illustrating the department and clerk's keys the indicating mechanism and record strip printing mechanism as well as the connection for setting up the type carriers for each.

For convenience of description the principal elements of the machine will first be enumerated and their general purpose, arrangement and co-operation briefly explained in order to indicate the general operation of the machine as a whole, after which the preferred construction of these parts will be described more in detail together with the function, construction and operation of certain secondary or accessory mechanisms associated therewith.

The cash register shown and described in the present application is of the key operated type, that is, the various functions usually performed by machines of this type, such as registering, indicating and recording the transactions entered, are directly effected and controlled by the operated keys. The keys are arranged in groups or banks, three banks being provided for the amount or value keys, a bank for the department keys, which are for the purpose of obtaining a segregated analysis of transactions entered in the machine and a special bank of keys known as the "clerks" or identifying keys. The department keys have various functions such as releasing the amount and clerks' keys for depression, actuating the totalizer engaging mechanism, setting a special type carrier and adjusting a special indicator which indicates which department key has been operated.

The illustrative machine is further provided with multiple totalizers, one for each department key, for registering the items entered in the machine. The description of the machine has throughout contemplated its use in a store having different departments, one machine being provided for use in a number of departments, but it will be understood that this classification is employed merely by way of example and for simplicity and clearness, and that the department keys may be used in connection with different plans of classification.

The clerks' keys of which there are four in number, elevate to exposed position a special indicator identifying the clerk operating the register and at the same time they set a special type carrier which prints upon the check and record strip a suitable character.

Depression of the amount keys will elevate suitable tablets which indicate the amount of the transaction entered in the machine. Multiple totalizers, four in number, as previously stated have been appropriated one to each department key. Depression of a department key to a point called the "coupling point" will establish a cooperative relation between the totalizer pinions and the racks which are driven by depression of the amount keys. When the coupler is lifted a certain amount by a depression of a department key, it is stopped and held in this position. At this point other keys may be attached to the coupler and full depression of all the keys so engaged may be effected by pressure applied to any one key.

When the keys are depressed certain locking mechanism is rendered operative whereby the keys are locked in their depressed positions and the check issuing lever is released for operation. When the keys are locked down in their depressed positions, the type carriers which have been adjusted will be retained in their set positions to allow an impression to be made therefrom.

The record strip printing mechanism has associated therewith a set of item and identifying type carriers from which an impression is taken during an operation of the machine. The usual paper and inking ribbon feeding mechanism is provided for the record strip printing device. After the record strip has been printed the part of the strip which has been printed upon is immediately brought into the view of the operator.

The check printing mechanism has been designed as a unitary structure and is capable of being removed from the machine for adjustment and repairs. The type carriers have suitable connections with the differential mechanism so that an impression can be taken therefrom upon an issued check. Besides being capable of printing the amount, certain identifying characters the consecutive number of the check and date are also printed upon the check. Normally, the check issuing lever is locked against manipulation but a depression of the keys will free the same for operation, and operating the check lever will release the depressed keys. This interlock mechanism compels the operator to issue a check each time the machine is operated. The check strip feeding mechanism in the present machine is of novel construction and simple in operation. Included in the same are precautionary devices which prevent over-throwing of the electro or paper feeding roller and prevent the disturbing of the timing relation between the check issuing lever and paper feeding roller. As is usual, the electro is adapted to print on the face of the check advertising matter which may be changed at will.

The organization and operation of the mechanism as a whole having been thus outlined generally, the preferred construction of the various parts above referred to will now be described more in detail and the construction and operation of certain accessory mechanisms explained.

Frame work and cabinet

The mechanism of the illustrative embodiment is carried by suitable supporting elements comprising a base plate 20 (Fig. 3) to which are secured two upright frames or castings designated by reference characters 21 and 22 and clearly shown in Fig. 2. Securely fixed between the members 21 and 22 is a front cross bar 23 and also extending between the rear portions of the member 21 and 22 is a second cross bar 24 adapted to support the indicating mechanism, and key locking mechanism, and serves also as a support for intermediate frames and to give strength and rigidity to the upright frames.

The machine has four intermediate frames parallel to the side members 21 and 22 as shown in Fig. 2. The frames 25 and 26 which support the four totalizers are secured to the cross bar 24 by any suitable fastening means (see Fig. 4) and at their front to a shaft 27 carried by the cross bar 23. The printer supporting frame for the record strip comprises two vertical plates 28 and 29 (Figs. 2 and 3) the rear ends of which are provided with slots 30 to engage a rod 31 carried by the cross bar 24. Extending between and secured to the upper rear ends of the side plates 28 and 29 is a cross member 32 which is fastened to the rear supporting frame 24. The check printer supporting frame comprises two side plates 33 and 34 (Figs. 2, 7 and 8) each of which is slotted at 35 to receive a stud 36 secured to the rear frame 24. At their front ends the plates are suitably slotted so as to engage the shaft 27 in a manner quite similar to the intermediate totalizer supporting frames 25 and 26. The manner in which the various mechanisms are carried by the different supporting members will be explained more in detail hereinafter.

The interior mechanism is enclosed by a suitable cabinet or casing indicated generally by reference numeral 37 provided with suitable key slots 38 and opened at its upper portion to expose the indicators. The lower portion of the cabinet encloses a drawer 39 or a plurality of drawers if so desired, which are released during an operation of the machine in a manner well known in the art. Projecting through a hinged cover 40 is a check issuing lever 41 and date setting levers 42. This cover is suitably cut away at 43 to expose the record strip upon which are successively imprinted the different items which are entered in the machine.

Keyboard

As previously stated the keyboard of the present machine comprises three separate and independently operable groups of keys; numeral keys which may further be subdivided into denominational orders for entering amounts from 1¢ to 9¢, 10¢ to 90¢, and from $1.00 to $5.00, a group of four keys designated as departmental or classification keys and a third group of keys known as clerks' or identifying keys.

Key coupler

As is usual in cash registering machines of the key operated type there is provided a key coupler 50 resting upon the rear ends of the keys, and as is best shown in Figs. 3, 4 and 7, pivotally mounted at 51 to the side frames 21 and 22. Mounted upon the nose of the key coupler 50 is a series of spring-pressed latch plates 53, one being provided for each group of keys. The nose of the coupler and the latch plates are adapted to enter the notches 49 formed in the rear ends of the keys when the coupler is lifted by a depression of the keys. The construction and purpose of key coupler mechanisms is well known in the art and need not be discussed herein.

Connected to the key coupler 50 is a plate 54 (Figs. 2 and 4) provided with a double rack 55, the teeth of which are adapted to alternately engage the teeth of a pinion 56 fast to a shaft 57 which is suitably journaled in the side frames 21 and 22. The connection is such that as the coupler is rocked by the keys the rack 55 is raised and lowered and will effect a complete rotation of the shaft. The shaft 57 carries cams and other devices for operating and driving various parts of the mechanisms. The mechanism for effecting a rotation of the shaft is also old and is not described in detail.

Amount keys

The amount keys 44 which extend across the machine as shown in Fig. 1 are loosely pivoted about midway upon a transverse rod 45 (Figs. 4 and 7) and have their rear ends resting upon a portion of the base plate 20. The amount keys are suitably guided in their reciprocating movements by the key slots 38 referred to hereinbefore and at their rear ends by slots 47 formed in a guide plate 48 carried by the rear supporting frame 24. Each amount key is provided with a notch 49 at its rear end as hereinbefore stated and an upwardly extending arm 70 carrying an anti-friction roller 71, the purpose of which will be explained later.

Clerk's keys

The clerk's keys 58 of which there are four in number comprise the group of keys situated at the left hand end of the keyboard and are in all respects similar in construction to the amount keys just described and in view of the above it is not deemed necessary to describe these further.

Departmental keys

This group of keys 59 is located between the clerks' group of keys and the dollars denominational group of numeral keys and comprise four in number. Each key has associated therewith a particular totalizer so that the item comprising the sale of goods of a certain department may be entered into the proper totalizer by simply depressing the corresponding departmental key to select its totalizer for operation. Instead of the keys and associated totalizers being appropriated to different departments they may be used for registering items of other classifications, and, in general, may be used to make any segregated analysis of transactions. Although four totalizers have been shown this number is not the essence of the invention and this number may be altered to meet the exigencies of a particular case.

These keys, besides having certain other functions, such as selecting the corresponding totalizer for actuation and exposing the appropriate indicator, also serve as a means whereby the key coupler may be partially raised to what may be termed the coupling point, in which position other keys representing the amount and one of the clerks' keys may be engaged with the coupler so that the operation of the entire set of keys so engaged with the coupler may be completed by pressure applied to any engaged amount or clerks' key. The manner in which these keys perform this function will be briefly explained herein, but for a more detailed showing and description of the coupler starting mechanism reference may be had to the Fuller application S. N. 283,720 and the British patents above cited.

This construction is best illustrated in Fig. 3 of the drawings wherein it will be seen that each departmental key 59 is pivoted upon the key rod 45 and is provided with a cam surface 60 cooperating with a face 61 on a shoulder of the coupler 50. The surface 62 of the cut in each key provides a stop face which engages the front edge of the coupler and stops the motion of the keys and key coupler. From this it is evident that when a key 59 is depressed the cam edge 60 will co-operate with the shoulder 61 to rock the coupler upwardly until the surface 62 acts against the edge of the coupler to arrest further movement of both key and coupler. When the coupler and keys are so elevated they are held in this partially elevated position by the full stroke mechanism but when the finger is removed from the key cap of the depressed departmental key the rear end of the key will drop backwardly to its normal position until a finger 63 formed thereon rests upon a lug 64 formed on the shoulder of the coupler. At this time other keys may be slightly depressed to engage them with the coupler for further operation.

Key locking and interlocking mechanism

In machines of this class it is necessary and desirable that mechanism be provided for preventing the operation of more than one key of a group and to compel the operation of the keys in a certain sequence.

To prevent the operation of more than one key in a bank a plurality of oscillatory members known as "back hangers" are provided and hung between the rear ends of the keys of a particular group. One of these is shown in Fig. 3 and denoted by reference character 65. This sort of mechanism is well known in the art and it is believed not necessary to enter into a detailed description of the same.

In order to prevent the operation of any of the amount of clerks' keys before a departmental key any form of interlocking mechanism may be utilized, such as, for example, that shown and illustrated in the British Patent #135,456 above cited.

Indicating mechanism

The indicators are of the bar and tablet type; the tablet indicators exhibiting characters indicating the amount of the transaction and identifying the clerk operating the machine while the function of the bar indicators is to inform persons what department has been credited with the amount of the sale shown by the amount indicators. As is usual the tablet indicators bear characters upon both faces permitting a front and back indication.

As previously stated the departmental indicators are of the bar type and extend transversely of the machine. A plurality of these indicators are provided so as to give a front and back indication and are further so constructed and located with respect to the clerks' and amount indicators as to perform the function of a flash; i. e., to conceal the tablet indicators while they are being raised to their uppermost position, and expose the tablet indicators after they have been elevated when the bar indicators are returned. When the amount and clerks' tablet indicators which have been raised by the depression of their associated keys and held latched in their uppermost position, the departmental indicators are lowered are set so as to exhibit indicia which serves to show which department has been credited with the sale.

The amount indicators 72 (Figs. 1 and 2) are disposed in three denominational groups for exhibiting amounts of cents, dimes and dollars denomination. The tablets comprising each group have their stems offset or staggered so that they will be immediately above and rest upon the rear end of their corresponding keys so that when a key is depressed it will lift its related indicator into view. The means for retaining the indicators in their elevated positions and for releasing them upon a subsequent operation is not shown in the present application, but one form which this mechanism might take is illustrated and described in detail in the Fuller application S. N. 263,125 and the British patents previously referred to. The clerks' or identifying indicators 73 comprise a group of four indicators bearing characters A, B, C and D, the stems of which are offset in a manner similar to that of the amount indicators. When a clerk's key is depressed the appropriate indicator will be lifted and held in its elevated position while the key is being returned to normal in a manner well known in the art.

The departmental indicator frame comprises two vertical slides 74 and 75 (Figs. 2 and 3) located at opposite sides of the cross bar 24 and suitably guided in their reciprocating movements by guide slots 76 formed in the cross bar 24. The lower end of each slide is provided with a forwardly extending tail 77 resting upon the nose of the key coupler 50 the result of this construction being that each time the coupler is reciprocated a like movement will be imparted to the indicator frame. The upper end of each slide is bifurcated to provide arms 78 and journaled in the arms between the slides are the departmental indicators 79¹. The indicators are provided with four faces each bearing the word "Department" at one end and at the opposite end the number of the department.

Secured to one end of the shaft which supports the departmental indicators are pinions (not shown) in continuous engagement with a gear sector 79 (Fig. 3) rotatably mounted at the upper end of the slide 74. It is obvious that in order to display the proper indication all that is necessary is to properly position the gear sector 79. Further cross connections between the two slides comprise a shaft 80 supported by ears 81 integral with the cross bar 24 and which carries at its extreme ends pinions 82 in continuous engagement with teeth 83 formed on the front edge of the slides 74 and 75. This construction insures that the slides both receive the same amount of lifting movement and gives strength and rigidity to the frame.

Secured to the gear sector is a stud 84 which is drawn downwardly by a spring (not shown) until it abuts against a stop surface 85 formed as part of the slide 74. When in this position the indicators are set in their normal position and the frame and indicators will be merely reciprocated during an operation of the keys. During such an operation the gear sector will not be moved and the faces of the departmental indicators will exhibit "Department No. 2".

In order to position the gear sector so as to exhibit the other faces there is provided a plurality of slides D¹, D⁴ and D³ (Fig. 2) which are provided with rearwardly extending shelves 86 which are in the path of a stud 87 (Fig. 3) carried by the gear sector 79. The slides are suitably guided in a manner similar to the amount indicators, the slide D¹, having its stem resting upon the department key "1" while the slides D³ and D⁴ have their stems resting respectively upon the rear ends of department keys "3" and "4" respectively. The shelves 86 are of varying heights so that if department key "3" is depressed the slide D³ will be lifted and held latched in its uppermost position while the indicator frame is descending the stud 87 will contact with the shelf of the slide D³ and upon further descent of the frame will rotate the gear sector and the indicator bars 90° to exhibit "Department No. 3".

When the department keys "1" and "4" are depressed the transaction indicators will be rotated either 180° or 270° to exhibit the proper faces of the departmental indicators in a manner similar to that just explained.

The details of construction of this mechanism are disclosed in the Fuller application S. N. 283,720 and the British patents above cited, to which reference may be had for further information.

*Differential mechanism*

For the purpose of differentially actuating the totalizer and for setting the item type carriers, each amount key is provided with the upwardly extending arm 70 carrying the roller 71. The rollers carried by the keys operate in slots 90 (see Fig. 12) formed in cam plates 91. The cam plates 91 are rigidly mounted in a frame 93 loosely mounted upon a shaft 94 which is journaled between the vertical frames 21 and 22. The slots 90 in the cam plates 91 are graduated so that each of the keys will impart a differential movement to the frame 93. As previously stated the amount keys are arranged in groups and for each group there is a differentially actuated frame 93. To permit the upward tilting movement of the cam plates 90 and associated differential frame 93 without interfering with the rollers of the unoperated keys each cam plate is provided with an arcuate slot 94.

The three segmental racks 96 which actuate the totalizer elements are concentrated at substantially the midportion of the machine (Fig. 2) and are loosely mounted upon the shaft 94. In order to transmit motion from the differentially actuated frames 93 to the corresponding segmental racks any convenient bail mechanism may be utilized, such as that shown in the Fuller application S. N. 263,125, and the British patents above cited. From the foregoing it will be evident that when an amount key is depressed the frame 93 is differentially actuated and through suitable connections will impart a like movement to the segmental racks 96. Movement of the segmental racks will actuate the totalizer elements a corresponding amount as well as serve to set up item type carriers for the record strip and check printing mechanism as will presently be described.

The group of keys 59 comprising the department keys are similar in construction to the amount keys and also have associated therewith a differentially actuated frame 97 (Fig. 2) to which are secured a plurality of cam plates 98. The frame 97 has rigid with it a segmental rack 99 provided to drive certain mechanism for setting up the type carrier relating to the departmental keys but it does not, of course, actuate any of the totalizer elements, and for this reason the teeth of the lower part of the rack 99 are cut away.

Also associated with the clerks' keys 58 is a differentially actuated frame 100 (part of which has been broken away in Fig. 2 to show certain other mechanism) similar to the frames relating to the other groups of keys with the exception that the said frame is pinned to the shaft 94 instead of being loosely mounted thereon as in the case with the other differential frames. Secured to the shaft 94 are two segmental racks 101 and 1021 for setting up the item type carriers relating respectively to the record strip and check printing mechanism. The manner in which the differential movement of the racks 101 and 1021 is imparted to the type carriers will be explained hereinafter.

Totalizers

In the present application a plurality of totalizers, four in number are disclosed, the totalizers being of the type shown and described in detail in the copending application of Chas. W. Green, S. N. 607,609 filed Dec. 18, 1922, and issued February 24, 1931 as Patent 1,793,795.

The totalizers are substantially alike in all respects and a brief description of one will suffice for all. The totalizer elements 102 are rotatably mounted on a transverse shaft 124 journaled in ears 103 (Fig. 2) integral with a totalizer frame 104. The frame 104 is provided with bearings 105 which are adapted to receive studs (not shown) carried by the supporting frames 25 and 26 previously mentioned. The result of this construction is that the totalizer may be oscillated bodily about the studs at the proper times to move the totalizer wheels 102 into or out of engagement with the actuating segments 96. The transfer mechanism for the totalizer elements comprises no part of the present invention and so is not described or shown in detail, but full information regarding the construction and operation thereof is given in the Green application above cited.

The totalizer engaging mechanism is adapted to operate and move the pinions of the selected totalizer into engagement with the actuating racks 96 during the depression of keys, and to be disengaged therefrom at the extreme end of the downward stroke, or if so desired during the first part of the upward stroke, and remain disengaged during the time the keys are returned to their normal position. The means for effecting such engagement and disengagement will now be set forth.

In the illustrative embodiment, while a department key is being depressed to the coupling point the main drive shaft 57 will be partially rotated to operate certain mechanism to effect the engagement of the four totalizers with the actuating segments. It is of course, undesirable that the four totalizers be actuated during the same operation and to this end other mechanism which is under the control of the operated department key will come into play and disengage the totalizers which are not appurtenant to the department key which has been depressed, with the net result that only the desired totalizer is in engagement with the actuators and operated during an operation of the machine.

For throwing the four totalizers into engagement the following mechanism is employed. Fixed to the rotation shaft 57 are complementary cams 108 and 109 the peripheries of which cooperate with rollers 110 and 111 carried by an arm 112 pivotally mounted on a shaft 113 near the base of the machine. Secured to the arm 112 is a bail 115 (Figs. 2 and 3) which is provided at one end with a forwardly extending arm 116 articulated at 117 to a vertical operating link 118. Connected to the upper end of the link 118 is a main totalizer engaging plate 119.

As clearly shown in Fig. 4 the main totalizer engaging plate 119 is formed with a plurality of square notches 120 the plate itself being slidably mounted by means of studs 121 passing through suitable elongated slots formed in the plate 119 and secured to the supporting frame 25.

For throwing each totalizer into engagement each totalizer is provided with individual cam plates 122 formed with cam slots 123 engaging the shafts 124 which support the totalizer wheels 102. The other end of each cam plate is bifurcated to receive a stud 125 and is also provided with a stud 126 which is received by the square notches 120 formed in the plate 119.

The result of the above construction is that whenever a department key is depressed to the coupling point the drive shaft 57 will be partially rotated and through the connections just described will impart a downward movement to the main totalizer engaging plate 119. By virtue of the pin and slot connection between the plate 119 and the individual cam plates 122, each cam plate will be rocked about its stud 125 as a pivot and rock the related shaft 124 downwardly. The downward rocking of the shaft 124 will rock the totalizer frame 104 about its pivotal support and bring the totalizer pinions into engagement with the actuating racks and retain the same in such engagement during a further depression of the keys in order to accumulate the item entered in the machine.

In order to disengage the proper totalizers the totalizers are each provided with an associated throwout cam plate denoted by reference characters 130, 131, 132 and 133. The throwout cam plates are mounted adjacent to each other and are provided with elongated slots engaging the guide studs 121 so as to be slidable in a manner similar to the main engaging plate 119. Each cam plate is provided with a throwout cam slot 134 engaging the stud 126 of the associated cam plate 122.

Fig. 5 illustrates an operated condition of the machine the lower totalizer being shown in engaged position with respect to the actuators while the others shown in this view are disengaged. When a department key was depressed, all the cam plates 122 were rocked downwardly, (clockwise Figs. 4 and 5) thereby tending to mesh all the totalizers with the actuating segments. At the same time by means which are under control of the operated department key and which will presently be described the cam throwout plates 131, 132 and 133 associated with the three unrelated totalizers are actuated upwardly. The result of this upward movement is that the studs 126 of the cam plates associated with the totalizers which are to be disengaged will be cammed outwardly keeping the totalizer supporting shaft 124 in its forward position thus preventing an engagement of the totalizer pinions with the actuating racks. In Fig. 5 it will be seen that the cam plate 130 associated with the lower totalizer has been unoperated and as a result the stud 126 occupies a medial position in the cam slot 134 but the studs 126 of the other cam plates 122 occupy the lower portions of the cam slots 134 thus throwing the totalizers out of engagement. The broken concentric lines designated as "In" and "Out" show the various positions the supporting shafts 124 occupy when the totalizers are in or out of mesh respectively.

The connections between the different throwout cam plates 130, 131, 132 and 133 and their respective keys whereby the totalizers which are to be unoperated are kept out of mesh with the actuating segments will now be described. Mounted upon a shaft 140 journaled between the side frame 21 and totalizer supporting frame 25 is a series of nested sleeves 141 each sleeve having secured thereto at its right end (as viewed in Fig. 2) a throwout arm 142 each engaging a notch 143 formed in the lower end of the cam plates 130, 131, 132 and 133 as best shown in Figs. 4 and 5.

Loosely mounted upon the outer sleeve 141 are a plurality of cam arms 145 best shown in Figs. 2, 3 and 13. Each cam arm 145 is adjacent to a department key 59 and is provided with a cam slot 146 engaging a stud 147 carried by the department key.

Mounted adjacent to and secured by rivets to each arm 145 is a finger 149 projecting into slots 150 cut in the sleeves as best shown in Fig. 13. From an inspection of this figure it will be seen that the forward edge of the finger 149 is not in contact with the forward edge of the slots formed in the tubes 141 while the rearward edge directly contacts with three of the sleeves, an arcuate clearance slot being left between the finger 149 and the sleeve which is not to be actuated during a depression of the associated department key 59.

The result of this construction is obvious. When a department key 59 is depressed the stud 147 will rock the cam arm 145 rearwardly moving the finger 149 in the same direction and since it contacts directly with three of the sleeves will rotate them in the direction of the arrow shown in the left hand figure of Fig. 13. By virtue of the clearance slot formed in the sleeve lying immediately over the shaft 140 this particular sleeve will not be operated the finger 149 merely playing idly in this slot. Since the throwout arms 142 are secured to the opposite end of each sleeve they will be rocked downwardly and operate their respective throwout cam plates to prevent the totalizers from being engaged with the actuating segments in a manner hereinbefore described.

Fig. 13 illustrates the different arrangements between the sleeves 141 and the fingers 149 associated with the different department keys 59. Each part of the figure shows a clearance slot for a particular sleeve while the other three will be directly operated by a depression of a department key to perform the functions hereinbefore described.

In order to return the operated sleeves to their normal position after being operated the following mechanism is employed. Loosely mounted upon the outer sleeve are a plurality of rearwardly extending arms 152 best shown in Figs. 2 and 14 each provided with a finger 153 similar to the finger 149 previously mentioned. The finger 153 in the present instance has an idle movement in the slots 154 formed in three of the sleeves but moves in the sleeve with which it is associated. Whenever a particular sleeve is operated it will tension a spring 155 connected to its corresponding arm 152, the said spring tending to return the sleeve and associated parts to normal position.

In describing the construction of the totalizer engaging mechanism it has been necessary incidentally to give a thorough explanation of the operation and function of the different devices as they were taken up in order. It is thought therefore that a summary of operation of this mechanism as a whole may in this case be omitted.

In addition to having a plurality of totalizers for keeping a classified record of transactions, the machine shown herein is provided with recording devices adapted to print upon a record strip retained in the machine and a check printing mechanism for issuing checks.

Being thus provided with a check issuing device and a record strip, the machine affords protection to the customer or payer and also to the proprietor or manager of the business. The check is given to the customer as a receipt, and the record strip receives an impression identical to that printed on the issued check so that the proprietor is provided with a printed record of every transaction that has taken place.

In addition to printing the amount, etc., on the check strip suitable printing devices imprint upon the face of the check a consecutive number as well as the date. An electrotype also prints upon the check the name of the company or any additional matter, as an advertisement of the establishment in which the machine is used. A sample of the work accomplished by the check printer is illustrated in Fig. 6. From this figure it may be seen that the type carriers of the check printer must be adapted for printing "amounts", a "department number", a "clerk's identifying character", a "consecutive number" of the check and finally the date of the transaction. In addition to the above the printing roller prints the name of the proprietor and his address.

For feeding a check through a slot in the cabinet a check lever 41 operating in a slot 161 in the cabinet is provided. The check lever 41 actuates a printing hammer when operated and in order to print the amount etc. upon the check it is necessary that the type carriers be locked in their adjusted positions. For this reason certain locking devices are provided for locking the keys in their depressed position.

Besides serving to retain the type carriers in their adjusted positions the locking devices just referred to act as an interlock between the check lever and operating keys and control the sequence of the operation of the keys and check lever. Operation of the check lever will affect the interlock to free the depressed keys for operation but freeing them at the same time will render the locking device effective to prevent a second operation of the check lever without an intervening operation of the operating keys. This sort of mechanism compels the operator to issue a check each time that the machine is operated.

The description of the recording mechanism will be divided into two sub-headings, first, the check printer and second, the record strip printing mechanism.

For transmitting movements from the segmental racks 96 for the item entering keys and the segmental rack 99 which is differentially actuated by a department key, there is provided a series of shafts 162 (Figs. 2 and 4 and 8), journaled in the side frames 25 and 26, and which are concentrically disposed with relation to shaft 94 upon which the racks 96 and 97 are mounted. The shafts each carry pinions 163, at substantially their mid-portions, meshing with their respective racks. Loosely mounted upon the shaft 94 is a number of segmental racks 166, meshing at the rear with pinions 165, secured to the shafts 162. The forward portions of the rack teeth of the segmental racks 166 mesh with pinions 167 secured to the ends of a series of nested sleeves mounted on a shaft 168 and which are best shown in Fig. 10. Secured to the opposite ends of the sleeves are a plurality of type carriers, reference character 170 denoting the type carriers for printing the amounts while 171 denotes the special type carrier which has engraved upon its periphery numerals corresponding to the operated department key. To distinguish the numerals indicating the amount of the transaction from the number of the department the last mentioned characters are surrounded by a circle, but obviously any other mark may be used to distinguish one from the other.

As previously stated the segmental rack 1021 which is actuated differentially by an operation of a clerks' key 58, is secured to the shaft 94 and meshes with a pinion 172 at its forward end. As in the case with the pinions 167 the pinion 172 is secured to a sleeve which carries at its other end a special type carrier 173 bearing alphabetical characters relating to the different clerks' keys.

In axial alignment with the type carriers 170, 171 and 173 are type carriers 174 and 175, the type carriers 174 being utilized for printing the days of the month while the type carrier 175 carries projecting type faces indicating the abbreviations of the months of the year.

Meshing with the teeth of a pinion 176 rigid with each of the type carriers 174 and 175 is a pinion 177 secured to one of a series of nested tubes 178 surrounding a shaft 179 journaled between the printer supporting side frames 33 and 34. Secured to each sleeve at ends which are outside of the frame 33 are pinions 180. Meshing with these pinions are three segmental racks 181 loosely mounted on the sleeve 171 to which is secured the type carrier 171.

For setting the desired date characters to the printing line segmental racks are provided with three setting levers 42, each provided, with a pointer which passes over a scale (see Fig. 1) upon which is engraved characters corresponding to those borne by the peripheries of their corresponding type wheels. Aligning pawls which are similar to the pawls 188 (Fig. 9) shown in connection with the consecutive number printing wheels insure that the characters are adjusted properly with respect to the printing line and serve to prevent accidental movement of the adjusted type carriers.

Mounted upon the shaft 168 and therefore, in axial alignment with the other type carriers previously mentioned are type carriers 1801 for printing the consecutive numbers upon the issued checks. Each of the type carriers just described has affixed thereto a ratchet wheel 1811 best shown in Fig. 9; each ratchet wheel being provided with a recess or deep notch for effecting transfers.

Embracing the group of printing and ratchet wheels just mentioned is a yoke 182 having arms with their inner ends pivoted upon the shaft 168. Journaled between the yoke at its rearward end is a yoke shaft 183 supporting a spring pressed multi-tined pawl 184, having one tine for each ratchet wheel 1811.

As best shown in Fig. 9 the engaging ends of the tines of pawl 184 terminate in different planes, that is the contacting ends of the pawl are successively arranged. These ends coact with the notches formed in the ratchet wheel so that when a lower order wheel has passed the nine position the pawl corresponding to the next higher order wheel will engage its ratchet wheel so that when the yoke 182 is operated a unit will be transferred to the wheel of the higher denominational order. This deep notch transfer is well known in the art and for this reason is briefly explained herein.

For operating the yoke to add a unit to the consecutive numbering wheels the following mechanism is employed; as best shown in Fig. 7, the pawl supporting rod 183 has its right hand end extending outward and projects through an arcuate slot 184 formed in the side frame 34. The rod 183 plays in a cam slot 185, formed in a forward extension of the check lever 41 which is pivoted at 186 to the side frame 34. The design of the cam slot is such that when the said lever 41 is moved forwardly the yoke 183 will be moved downwardly permitting the pawls 184 to ride idly downwardly over the ratchet wheel teeth without disturbing the consecutive number wheels while printing is taking place. When the check lever is returned the return movement of the yoke 183 will actuate the pawl 184 so that a unit will be added to the wheels as an incident to numbering and issuing a subsequent check.

As best illustrated in Fig. 9 spring pressed retaining pawls 187 prevent retrograde movement of the wheels while the spring pressed aligning pawls 188 insure the proper positioning of the type wheels with relation to the printing line.

In the illustrative embodiment the keys are held depressed thus retaining the item type carriers in their adjusted positions and holding them adjusted during a forward movement of the check lever 41. In order to effect a printing impression from the type carriers there is provided a platen (Figs. 8 and 9) comprising side arms 190 and 191 (Fig. 2) and a cross head 192 provided at its underside with a rubber impression block 193. The side arms 190 and 191 are secured to a shaft 194 journaled between the side frames 33 and 34. As best shown in Fig. 2 the shaft 194 has secured at its right end a platen operating arm 195. The forward portion of the platen operating arm is provided with a bent over lug 196 which is adapted to co-operate with a roller 197 carried by the check lever when the latter reaches its extreme forward stroke thereby depressing the impression block 193 against the type to effect a printing impression. To return the platen to its upward or normal position there is provided a spring 199 connected to a rearwardly extending arm 198 secured to the shaft 194. To prevent an accidental depression of the platen when in its normal position the rearward portion of the platen operating arm 195 has a bent over lug 200 underlying the roller 197.

The ink for printing from the different type carriers is supplied by an endless inking ribbon 202 (Fig. 7) passing over spools 203 and 204 and underneath a guide plate 207 which overlies the type carriers. The spools 203 and 204 are supported by brackets 205 and 206 respectively which are attached to their respective side frames.

The ribbon is given a step by step movement at each operation of the machine preventing successive impressions being made through the same portion of the ribbon. The mechanism for driving the ribbon comprises an upwardly extending feed pawl 208 (Figs. 7 and 10), which is carried by the rod 183 previously mentioned and spring pressed so that a bent lug formed upon its upper portion is in engagement with an angular slotted roller 209 integral with the spool 204.

It will be recalled that when the check lever 41 is moved forwardly the rod 183 will move downwardly and since the roller 209 is held by a certain amount of friction the lug will slide out of the angular slot in which it is normally located and will enter a lower slot as the stud 183 reaches its extreme downward movement. Upon an upward movement thereof caused by the return of the check lever the feed pawl 208 will rotate the roller 204 an increment thereby bringing a different portion of the ribbon over the type carriers.

The checks printed and issued are drawn from a roll 210 (Figs. 2, 7 and 8) of paper or other suitable material, loosely supported by a rod 211. The rod 211 is dropped in a trough formed by riveting U shaped pieces 212 to the frames 33 and 34 thereby holding the roll 210 in a position to facilitate its rotation and to allow a new roll to be readily placed therein when it is necessary to replenish the paper supply. The strip passes from the roll 210 between an upper guide plate 213 and lower guide plate 207 which has been previously mentioned. The guide plates extend between the side frames and may be secured thereto by any desirable means. The check passes between an electro roll 214 and an impression roll 2141 and as shown best in Fig. 7 out through a slot formed in the cabinet lid 40 and after being ejected and detached from the rest of the check strip it is handed to the customer as a receipt.

It is to be understood that the guide plates 207 and 213 are provided with suitable cutaway portions (not shown) to allow the impression block to pass through the same and depress the check strip against the ribbon and type carriers which are underneath the latter to effect a printing impression upon the lower face of the check strip.

The mechanism for feeding the check strip is best illustrated in Figs. 2, 7, 10 and 16. The driving shaft 215 for the electro and check strip is suitably journalled in the check printer side frames 33, and 34, and has secured to it at its extreme outer end a spool 217 provided with a single tooth or rib 218. Loosely mounted upon the extreme outer end of the shaft 215 is a gear pinion 219, in continuous engagement with a segmental rack 220 formed as a forward extension of the check issuing lever 41. Pinned to the gear pinion 219 loosely mounted upon the driving shaft 215 between the spool 217 and pinion 219 is an operating plate 221. The operating plate 221 has pivoted at its rear end a feeding pawl 222 which is spring-pressed so that its forward end is always in contact with the periphery of the spool 217 and normally engages the rear edge of the tooth 218 of the spool 217. The forward portion of the operating plate 221 is furthermore provided with a cam lug 223 the purpose of which will be described later. Pivotally mounted upon the printer side frame 34 one at each side of the tooth 218 is a retrograde pawl 224 and a stop or over-throw preventing pawl 225. A spring 2261 (Fig. 7) interposed between the pawls 224 and 225 forces the operating ends of the pawls downward so as to be in contact with the periphery of the spool 217. The over-throw preventing pawl 225 is furthermore provided with a lug 226 co-operating with the cam lug 223, hereinbefore mentioned. Normally the lug 226 rests upon the cam lug 223 as best shown in Fig. 7.

In the normal position of the parts which is illustrated in Fig. 16, the feeding pawl 222 has its operating end engaging the rear edge of the tooth 218, the retrograde pawl 224 occupying the same position as the pawl 222 while stop pawl 225 has its operating end in engagement with the front edge of the tooth 218.

The result of this construction is that when the check issuing lever 41 is pulled forwardly, the segmental rack 220 rotates the pinion 219 thereby rotating plate 221 and carrying with it the pawl 222, it being clear, of course, that no movement will be imparted to the spool 217 or the electro 214 while the check issuing lever 41 is being drawn forwardly. At the extreme forward movement of the segmental rack 220 the cam lug 223 will pass outside the lug 226 camming the lug 226 rearward thereby lifting the operating end of the pawl 225 above the tooth 218 and maintaining it in this position while the feeding pawl 222 slips over the said tooth. During the return movement of the check issuing lever the pinion 219 and operating plate 221 will be rotated counter clockwise, and the pawl 222 by virtue of its engagement with the tooth 218 will rotate the spool 217 and the electro in the same direction until the parts have returned to their normal position shown in Fig. 7. During the first movement of the spool by the pawl 222 the pawl 225 will be still held in its elevated position, but when the operating plate 221 is being returned to normal, the cam 223 will be disengaged from the lug 226 permitting the operating end of the over-throw preventing pawl 225 to contact with the periphery of the spool and engage the forward edge of the tooth 218 and stop the rotation of the spool 217 and electro at the proper time. By this means any attempt to overthrow the electro by quick and sudden movements of the check lever will be effectively prevented. It will be clearly seen in Figure 16 that normally the pawls 224 and 225 have their respective operating ends in engagement with the tooth 218, so that any accidental rotation of the electro will be prevented, thereby insuring the proper timing relation between the check issuing lever and the electro.

As previously stated, when the check issuing handle is being drawn forward the platen 193 will be actuated, thereby effecting a printing impression upon the check strip of the amount, date, identifying characters, and consecutive number of the issued check and as the check issuing lever is being drawn rearwardly the driving mechanism for the electro will now come into play, thereby rotating the electro 214. Rotation of the electro will print immediately above the matter printed by the platen 193 certain other matter such as the name of the proprietor, the nature of the business, and other additional matter. A sample of a check capable of being issued from the present machine is illustrated in Fig. 6.

In order to compel the operator to move the check issuing lever 41 an invariable distance during each operation there is provided a full stroke mechanism best shown in Fig. 7. This comprises a pawl 227 cooperating with rack teeth formed on a plate 228 secured to the check printer side frame 34. This sort of mechanism is conventional and well known in the art and for this reason its operation will not be set forth in detail. The check printer mechanism is furthermore equipped with an inking roll 2291 (Fig. 9) saturated with ink and spring pressed upward into contact with the periphery of the electro 214 to ink the electro-type during its operation.

As previously stated the operated keys are held in their depressed positions retaining the type carriers in their adjusted positions while the platen 193 is actuated by a manipulation of the check issuing handle to effect an impression from the type wheels. This mechanism will now be explained, a showing of the same being illustrated in Fig. 7 of the drawings.

Suitably guided in its vertical movement by a guide stud 229 is a locking plate 230 bifurcated at its lower end to engage the rotation shaft 57 previously mentioned. Connected to the check issuing lever 41 at 231 is a rearwardly extending arm 232 projecting through a slot formed in an ear 233 integral with the check printer side frame 34. The arm 232 is provided with a cam lug 234 the front edge of which is vertical and is normally in immediate contact with the rear vertical edge of a locking lug 235 integral with the locking plate 230.

From the above it will be evident that upon a depression of the keys the shaft 57 and a cam 238 will be rotated in the direction of the arrow shown in Fig. 7 a spring 236 forcing the lug 237 downwardly into contact with the concentric peripheral portion of the cam 238. At substantially the extreme downward movement of the keys the lug 237 will engage the horizontal edge 240 of the notch in the cam and since the radial distance from the center of the shaft to the edge 240 is less than the radius of the concentric portion 239 of the cam 238, the plate 230 will drop slightly downward, sufficiently to withdraw the lug 235 from locking co-operation with the lug 234. At this point in the cycle the edge 241 of the notch will abut against the rearward edge of the lug 237, preventing further movement of the shaft 57, and since the shaft 57 cannot rotate in a direction reverse to that illustrated by the arrow on account of the full stroke mechanism for shaft 57 previously mentioned, the keys will be held locked down in their fully depressed position.

The check issuing lever 41 is now unlocked and as the lever is drawn forward the lower edge of the oblique cam lug 235 will ride upon the upper edge of the lug 235, raising the arm 232 and tensioning a spring 244 connected thereto. At the extreme forward movement of the lever 41 the lug 234 will pass in front of the lug 235 the tension of the spring 244 assisting in this. During the time the check lever is returned to its normal position, the upper edge of the oblique cam lug 234 will contact with the lower edge of the lug 235 and lift the locking plate 230 upwardly. This lifting movement is sufficient to bring the lug 237 above the highest portion of the cam thereby releasing the shaft 57 and allowing the depressed keys to be returned to their normal position by the key coupler 50.

A second depression of the keys before the return of the check lever to its normal position is prevented by the cooperation of the lug 243 with the vertical edge 241. When the check lever 41 is fully home the lug 235 will pass over lug 234 allowing the spring 236 to depress the plate 230 thereby forcing the lug 243 out of the path of the vertical edge 241 of the cam 238. The parts will now stand in the position shown in Fig. 7.

*Recording mechanism*

Besides being capable of issuing checks the present machine is designed so as to print upon a record strip contained within the machine amounts commensurate with the keys depressed as well as identifying characters which are under control of the operating keys.

The record strip printing mechanism of the present application is substantially of the type shown and described in the application of Charles A. Thistlethwaite, Serial Number 631,223 filed Apr. 10, 1923. The printing mechanism in the present embodiment is not capable of printing totals from the totalizers as in the case with the Thistlethwaite application, and the printer as a whole has been reduced in width. Other changes which have been incorporated in the illustrative embodiment are the means for driving the inking ribbon and actuating the platen. The mechanism which has been changed will be described in detail in the present application and for further description of the old mechanism reference may be had to the Thistlethwaite application above cited.

The means for transmitting movements from the segmental racks to the type carriers is substantially the same as that shown in connection with the check printing mechanism. Each shaft 162 carries at its extreme left end (Fig. 2) pinions 250 meshing with segmental racks 251 which mesh at their forward ends with pinions 252. The pinions 252 are secured to the ends of a series of nested sleeves 253 secured to the outer ends of which are item type carriers 2561 (Fig. 3) similar to the type carriers associated with the check printing mechanism. The segmental rack 101 which is actuated by depression of the clerk's keys meshes directly with a pinion 254 secured to a tube carrying at its outer end a type carrier bearing characters identifying the clerk's key depressed. As in the case with the check printing mechanism the type carriers are retained in their adjusted positions while the keys are held in their depressed positions.

As previously stated, the impression making and ribbon and paper feeding mechanism is supported by side plates 28 and 29 connected by suitable rods and cross bars to form a unit and secured to the back frame 24 in a manner previously described. The paper storage roll and associated mechanism is mounted on a plate 256 pivoted at 257 to the side frame 28 in order that it may be rotated around this pivot when it is necessary to remove the paper from the storage roll or to replenish the paper supply. The storage roll (shown at 258) is journaled on a shaft 259 secured to the plate 256 and is provided with a ratchet wheel 260.

Rotatably mounted upon the shaft 259 between the ratchet wheel 260 and the frame 256 is an operating arm 261 carrying a stud 262 at its upper end and at its lower end a pivoted spring pressed feed pawl 263 engaging the teeth of the ratchet wheel 260. In order to prevent retrograde movement of the storage roll there is provided a retaining pawl 264 pivoted to the plate 256.

A shaft 265 extending transversely between the printer side frames 28 and 29 supports a cross bar 266 (Fig. 2) by means of forwardly extending arms 267 secured to the said shaft. The underside of the cross bar is provided with rubber impression block 268. Loosely mounted upon the platen supporting shaft 265 is a clutch element 269 provided with a channel adapted to receive a rib formed on the side of a platen operating arm 270. The clutch mechanism is similar to that shown in the patent to Raymond E. Rice #1,554,761 dated Sept. 22, 1925. The platen operating arm 270 extends rearward and is provided with a cam slot 271 co-operating with a roller 272 carried at the extreme end of an arm or bell-crank 273 (Fig. 11) secured to the printer operating shaft 274. The horizontal arm of the bell-crank 273 is provided with a roller engaging a box cam 278 (Fig. 11) secured to the rotation shaft 57. When the machine is operated the box cam will rock the shaft 274 to perform the function to be hereinafter described.

As clearly shown in Fig. 3 there is provided a U shaped receptacle 275 which extends transversely between the printer side frames 28 and 29 and extends forwardly and upwardly to form a paper guide plate 276. The supply paper roll is loosely placed in the U shaped receptacle, the paper strip being led from the roll, over the guide plate 276 over the shaft 265, under the impression block 268, over the cross bar 266 and thence to the storage roll 258. Secured to one end of the main operating shaft 274 which extends between the side frames is a vertical arm 277 bifurcated to engage the stud 262 carried by the upper end of the operating plate 261. From the above it will be evident that when the machine is operated, rotation of the shaft 57 will rotate the box cam 278, rock the shaft 274 clockwise, (Fig. 11) and through the vertical arm 277 will rock the operating arm 261 and parts carried thereby. Since the storage roll 258 will be held stationary by the retaining pawl 264 the feeding pawl 263 will be moved to engage the next tooth of the ratchet wheel and upon its return movement will rotate the ratchet wheel and storage roll an increment. By this means the items which have been printed upon the record strip will be spaced apart at regular intervals.

When the main operating shaft 57 is rotated the platen operating arm 273 will be moved forwardly but during the time the type carriers are being adjusted by a depression of the keys, the roller 272 carried by the platen operating arm will operate in the arcuate slot of the arm 270. At about the time the keys are fully depressed the type carriers are properly set and at this time the roller will engage the cam slot 271 depressing the impression block 268 to effect a printing impression upon the record strip.

The record strip is fed during the return movement of the keys and as often as it has been printed upon, the last printed item will immediately be brought into view of the operator through a cutaway portion 43 of the cabinet as illustrated in Fig. 1 of the drawings.

The endless inking ribbon for inking the type passes over rollers 280 over a tensioning roller 281 and around a felt roller 282 which is saturated with printing ink. Fast to one end of the felt is a ratchet wheel 283 (Fig. 2) the teeth of which co-operate with a feeding pawl 284 (Fig. 3) carried by an arm 285 pivoted upon the supporting shaft for the felt roller 282. The rear end of the arm 285 has a stud 286 in engagement with a notch formed in a forward extension 287 of the platen operating arm 273. From the above it will be clear that whenever the arm 273 is rocked forwardly the feeding pawl 284 will engage a ratchet tooth and rotate the felt roller a step, thereby bringing a fresh portion of the ribbon immediately over the item type.

From Fig. 3 it will be evident that in order to place a new ribbon in the printing mechanism it will be necessary to pass the same around the supporting shaft 290, for the item type carriers. For this reason a portion of the shaft 290 is cut away (see Fig. 2) the gap being bridged by a spring pressed plunger 291. This plunger 291 slides in a circular opening drilled in shaft 290, and is normally urged to the left into an aperture in plate 28 by virtue of a spring 291'. A slot 292' is provided in the upper portion of shaft 290 (Fig. 2) through which extends a pin 293' mounted on plunger 291. The pin 293' protrudes out of slot 292' and forms a means which may be manipulated to slide the plunger 291 to the right, thereby providing a space between the end of said plunger and the plate 28 through which the inking ribbon may be passed.

Referring to Fig. 1 there will be seen a card holder 300 secured to the upper lid 40 of the machine. Inserted in the card holder is an index card suitably ruled and provided with two columns, one for department numbers and one for listing the various articles associated with the proper department number. This index card will serve to refresh the memory of the operator as to the departmental classification of the different articles sold in a store. If so desired, the clerk's letters may be substituted for department numbers, and the name of the clerks placed in line with the assigned initial and in some cases it might be desirable to extend the card so as to include both of these features.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one form, as it is capable of various modifications and changes all coming within the scope of the claims which follow.

What is claimed is:—

1. In a cash register, the combination with an operating mechanism, a plurality of operating keys, type carriers for printing upon a record strip and issued checks, a differential mechanism under control of the keys for adjusting the type carriers, a check issuing lever, platens for printing upon the record strip and upon the check paper, the operation of the platen for the former being under control of the operating mechanism while the platen for the latter is under control of the check issuing lever and means for compelling the operation of both platens upon each complete operation of the machine.

2. In a cash register of the class described, the combination with a plurality of keys having an initial and a final operation, a differential mechanism under control of the keys, type carriers adjusted by movement of the differential mechanism and locked in their adjusted positions between the initial and final operation of the keys adapted to print upon an issued check, a normally retracted platen for taking impressions from the type carriers, a check lever, and means carried by the check lever for depressing the platen against the type to effect a printing impression upon the check strip.

3. In a cash register, the combination with a plurality of clerks' department and amount keys, a differential mechanism, type carriers set by adjustment of the differential mechanism for printing amounts and identifying characters associated with the clerks' and department keys, devices for locking the keys depressed, a check lever, a check strip, a platen, an electro provided with type for printing invariable matter upon the check strip, said electro being adapted to be operated during the return stroke of the check lever and means operated by the check lever for actuating the platen to print the amount and identifying characters from the adjusted type carriers during the forward stroke of the check lever, disabling the locking device and driving the electro to feed the check strip and simultaneously print the invariable matter upon the issued check strip.

4. In a machine of the class described, the combination with a series of normally unlocked keys, having an initial and final movement, a differential mechanism under control of said keys, type carriers adjusted by the movement of the differential mechanism and retained in their adjusted positions between the initial and final operation of the keys and adapted to print upon a check, printer side frames, a platen, pivoted between the side frames and provided with a crosshead overlying the type carriers, an arm secured to the pivot of the platen, a check lever and means carried by the check lever for engaging the said arm during its forward movement to depress the cross head against the type to effect a printing impression.

5. In a machine of the class described, the combination with a series of normally unlocked keys, having an initial and a final movement, a differential mechanism under control of said keys, type carriers adjusted by the movement of the differential mechanism and retained in their adjusted positions between the initial and final operation of the keys and adapted to print upon a check, printer side frames, a platen pivoted between the side frames and provided with a crosshead overlying the type carriers, an arm secured to the pivot of the platen, a check lever, means for preventing an accidental movement of the platen for effecting a printing impression, and means carried by the check lever for engaging the said arm during the forward movement of the lever to depress the crosshead against the type to effect a printing impression.

6. In a cash register, the combination with a printing mechanism, a paper feed device, a member secured thereto and movable therewith, having a single tooth, a check lever, a pawl pivoted to a stationary member engaging the single tooth to prevent retrograde movement of the paper feed device, and a second pawl operable by an operation of the check lever to rotate the paper feed device in one direction only.

7. In a cash register, the combination with a printing mechanism, a paper feed device, a member secured thereto and movable therewith having a single tooth, a plurality of pawls pivoted to a stationary member engaging said tooth for preventing movement of the paper feed device in either direction, a manipulative lever having connections for operating the paper feed device, and means under control of the manipulative lever for disabling one of the said pawls to permit movement of the paper feed device in one direction only.

8. In a cash register, the combination with a printing mechanism, a feeding device, a member secured thereto having a single tooth, a check lever provided with a segment rack, a pinion meshing with the segment rack, a plate secured to said pinion, a feeding pawl mounted upon said plate engaging the single tooth, a pawl in engagement with the single tooth normally preventing movement of the paper feed device in one direction and means on said plate for disengaging the last said pawl from the single tooth to permit the feeding pawl to rotate the paper feed device in one direction.

9. In a cash register, the combination with a paper feed roller, a member secured thereto having a projection, pawls in engagement with the projection for preventing movement of the member in either direction, an element carrying a feed pawl, and means carried by the element for disabling one of said pawls to allow the feed pawl to rotate the paper feed device in a single direction.

10. In a cash register, the combination with a paper feed roller having a single tooth, a retrograde pawl and a stop pawl engaging the single tooth for preventing movement of the paper feed roller in both directions, a lug integral with the stop pawl, a rotatable element provided with a pivoted feeding pawl, and a cam lug secured to said element for engaging the first mentioned lug and disabling said stop pawl to permit the feed pawl to rotate the feed roller in the desired direction.

11. In a cash register, the combination in a printing mechanism designed as a unitary structure and capable of being removed from the machine, of an electro printing roller, a member secured thereto having a projection, and pawls in engagement with opposite sides of the projection to prevent the accidental rotation of the electro when the printing mechanism is either in its operative position or removed from the machine.

12. In a cash register, the combination in a record strip printing mechanism, of printer side frames, inking ribbon, type carriers for printing upon a record strip, a shaft extending between the frames and carrying the type carriers the construction being such as to normally prevent the passage of a new endless inking ribbon around said shaft, and means for providing a passage way for the insertion of the inking ribbon.

13. In a cash register, the combination with amount and totalizer selecting keys, a plurality of totalizers, a main operating mechanism, a differential mechanism actuated by the amount keys, a plurality of pivoted cam plates each provided with a cam slot engaging a stud secured to an associated totalizer, means under control of the main operating mechanism for operating all the cam plates to move the totalizers into engagement with the differential mechanism, and means under control of a totalizer selecting key for simultaneously withdrawing the totalizers which are to remain unoperated out of engagement with the differential mechanism.

14. In a cash register, the combination with a plurality of totalizers, totalizer selecting keys, a main operating mechanism, a differential mechanism, pivoted cam plates capable of a sliding movement and adapted to be rocked by the main operating mechanism for engaging the totalizers with the differential mechanism, and means under control of an operated totalizer selecting key for imparting a sliding movement to the cam plates for disengaging all but the desired totalizer.

15. In a cash register, the combination with a plurality of totalizers, totalizer selecting keys, a main operating mechanism, a differential mechanism, pivoted cam plates capable of a sliding movement actuated by the main operating mechanism for engaging the totalizers with the differential mechanism, and means under control of an operated totalizer selecting key for simultaneously imparting a sliding movement to all but one of the cam plates for disengaging all but the desired totalizer.

16. In a cash register, the combination with a plurality of totalizers, a differential mechanism, a plurality of totalizer selecting keys, an operating mechanism, totalizer engaging cam plates capable of a combined rotary and sliding movement, the rotary movement being under control of the main operating mechanism for engaging all the totalizers with the differential mechanism while the sliding movement is under control of the totalizer selecting keys for disengaging all but the desired totalizer.

17. In a cash register, the combination with a plurality of totalizers, a main operating mechanism, a differential mechanism, pivoted totalizer engaging cam plates provided with studs, a slidable member, provided with slots engaging the said studs, and means operated by the main operating mechanism for actuating the slidable member for operating the engaging cam plates tending to engage all of the totalizers with the differential mechanism, and means permitting but one totalizer to engage said differential mechanism.

18. In a cash register, the combination with a plurality of totalizers, a main operating member, a differential mechanism, pivoted totalizer engaging cam plates, studs carried by said cam plates, a slidable member provided with slots engaging the said studs, and connections between the main operating member and the slidable member for operating the engaging cam plates tending to engage all of the totalizers with the differential mechanism, and means permitting but one of the totalizers to engage said differential mechanism.

19. In a cash register, the combination with a plurality of totalizers, a differential mechanism, a plurality of totalizer selecting keys, totalizer engaging cam plates capable of a combined rotary and sliding movement, a main operating mechanism, connections between the main operating mechanism and the cam engaging plates for imparting a rotary movement to the cam engaging plates for effecting an operative relationship between the differential mechanism and the totalizers, members for imparting a sliding movement to the cam plates to disengage the said totalizers and connections between the said members and the totalizer selecting keys.

20. In a cash register, the combination with a plurality of totalizers, a differential mechanism, cam plates for engaging the totalizers with the differential mechanism, a single means for actuating all the cam plates to engage all the totalizers, cam elements one for each totalizer for disengaging the totalizers, and means under control of the depressed totalizer selecting key to actuate all of the cam elements with the exception of the one associated with the totalizer which it is desired to retain in engagement.

21. In a cash register, the combination with a plurality of totalizers, a differential mechanism, totalizer selecting keys, means for engaging the totalizers with the differential mechanism, cam members for disengaging certain totalizers, arms for operating members, tubes movable with said arms, and means under control of the depressed totalizer selecting key for operating certain tubes and cam members associated with the totalizers which are not to remain in engagement.

22. In a cash register, the combination with a plurality of totalizers, a series of amount keys, a differential mechanism operated by the keys, totalizer selecting keys, means for engaging all of the totalizers with the differential mechanism, cam plates for disengaging desired totalizers, tubes for connecting the cam plates with the totalizer selecting keys and means operated by an operated totalizer selecting key for actuating more than one tube and the associated cam plates.

23. In a cash register, the combination with a plurality of totalizers, a differential mechanism, means for engaging all the totalizers with the differential mechanism, totalizer selecting keys, cam plates for disengaging desired totalizers, tubes for connecting the cam plates with the totalizer selecting key, means operated by an operated totalizer selecting key for actuating more than one tube and the associated cam plates, and means for returning the tubes and cam plates to normal after being operated.

24. In a cash register, the combination with a plurality of totalizers, totalizer selecting keys, a differential mechanism, means for engaging all the totalizers with the differential mechanism, cam plates provided with notches for disengaging certain totalizers, tubes having arms secured thereto engaging said notches, cam members operated by the totalizer selecting keys, fingers carried by each of the members projecting within slots in the tubes, the arrangement being such that the tube associated with the particular key depressed will not be operated thereby permitting the associated totalizer to remain in engagement.

25. In a cash register, the combination with a plurality of totalizers, a differential mechanism, cam plates for engaging the totalizers with the differential mechanism, and a second set of cam plates for disengaging certain totalizers, the movement of the cam plates being in opposite directions.

26. In a cash register, the combination with a plurality of totalizers, a main operating mechanism, a differential mechanism, pivoted totalizer engaging cam plates provided with studs, a slidable member provided with slots engaging said studs, and means operated by the main operating mechanism cooperating with the slidable member for operating the engaging cam plates thereby causing engagement of the totalizers with said differential mechanism.

27. In a cash register, the combination of a plurality of operating keys, devices for locking the keys in their operated positions, a differential mechanism actuated by said keys, type carriers adjusted by movement of the differential mechanism, a check lever, a platen for printing on issued checks, a check paper feeding device, means carried by the check lever for actuating said platen during movement of said lever in one direction and means actuated by said check lever when moved in the opposite direction for actuating the paper feeding device and releasing the locked keys.

In witness whereof I have signed my name hereto this 10th day of March, 1926.

FREDERICK L. FULLER.

CERTIFICATE OF CORRECTION.

Patent No. 1,874,276. August 30, 1932.

FREDERICK L. FULLER.

It is hereby certified that error appears in the printed specification of the above numbered patent requiring correction as follows: Page 3, line 35, for "member" read "members"; page 5, line 7, for "and" read "are"; and line 9, for "are" second occurrence, read "and"; page 11, line 99, for "235" read "234"; and that the said Letters Patent should be read with these corrections therein that the same may conform to the record of the case in the Patent Office.

Signed and sealed this 29th day of November, A. D. 1932.

(Seal)

M. J. Moore,
Acting Commissioner of Patents.